United States Patent [19]
Field et al.

[11] Patent Number: 6,014,487
[45] Date of Patent: Jan. 11, 2000

[54] FIBER OPTIC CABLE

[75] Inventors: Larry W. Field; Eric R. Logan; Katharine Newton; Richard S. Wagman, all of Hickory, N.C.

[73] Assignee: Siecor Corporation, Hickory, N.C.

[21] Appl. No.: 08/885,575

[22] Filed: Jun. 30, 1997

[51] Int. Cl.$^7$ ..................................... G02B 6/44
[52] U.S. Cl. .................. 385/110; 385/102; 385/113; 385/109
[58] Field of Search ...................... 385/100–114

[56] References Cited

U.S. PATENT DOCUMENTS

| | | | |
|---|---|---|---|
| 4,703,998 | 11/1987 | Uchioke | 350/96.23 |
| 5,133,034 | 7/1992 | Arroyo et al. | 385/107 |
| 5,390,273 | 2/1995 | Rahman et al. | 385/112 |
| 5,574,816 | 11/1996 | Yang et al. | 385/109 |
| 5,621,841 | 4/1997 | Field | 385/113 |
| 5,630,003 | 5/1997 | Arroyo | 385/113 |

FOREIGN PATENT DOCUMENTS

| | | |
|---|---|---|
| 1479427 | 7/1977 | United Kingdom . |
| 1601004 | 10/1981 | United Kingdom . |

OTHER PUBLICATIONS

Sketch of "Focus Sky Wrap" 3 Position loose tube design, (1992).

*Primary Examiner*—Phan T. H. Palmer
*Attorney, Agent, or Firm*—Timothy J. Aberle

[57] ABSTRACT

A fiber optic cable (10) includes a tube section (20) and an sheath section (40). Between tube and sheath sections (20, 40) is a series of general interstices (S), each general interstice (S) comprises a respective set of sub-interstices (S1,S2,S3). Each general interstice (S) comprises a respective interstitial assembly (30). Each interstitial assembly (30) provides crush strength resistance and water blocking features to fiber optic cable (10).

25 Claims, 4 Drawing Sheets

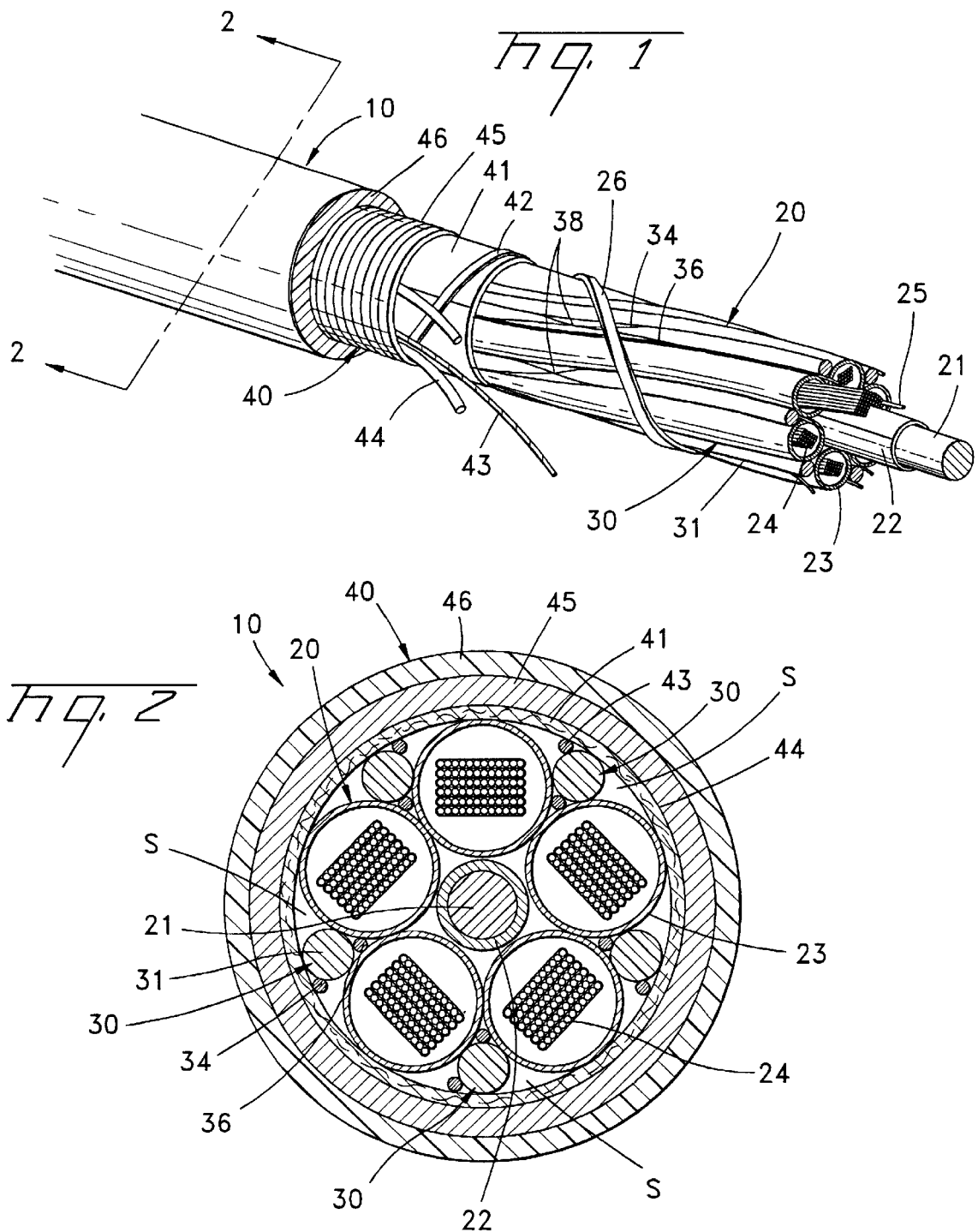

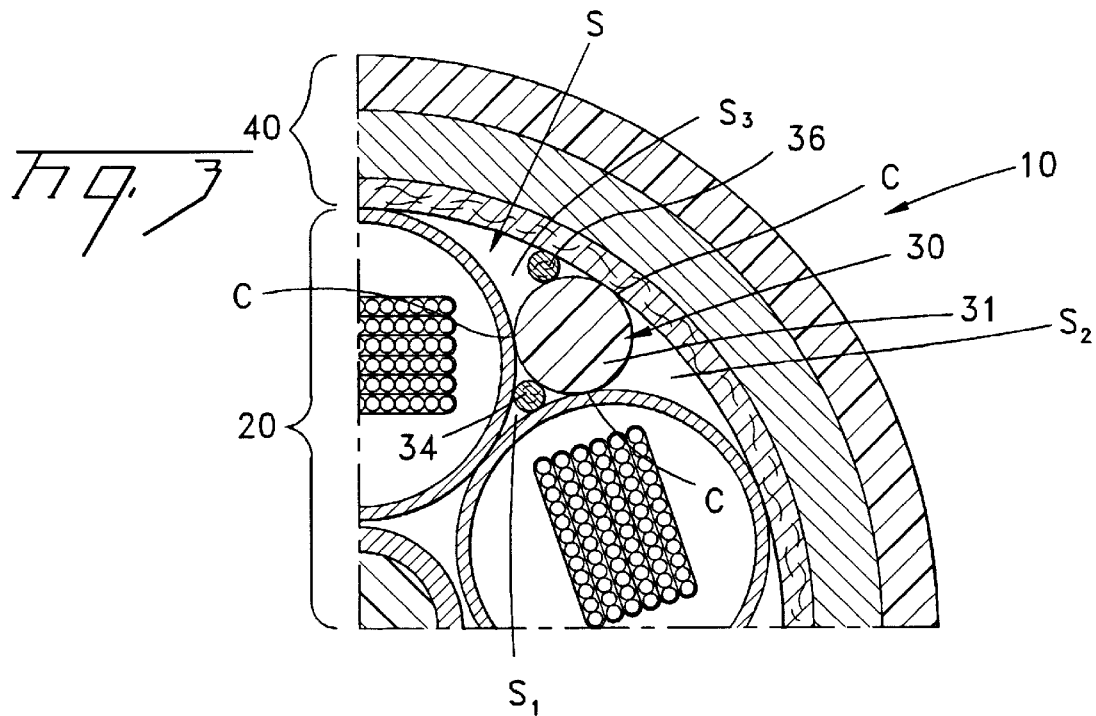
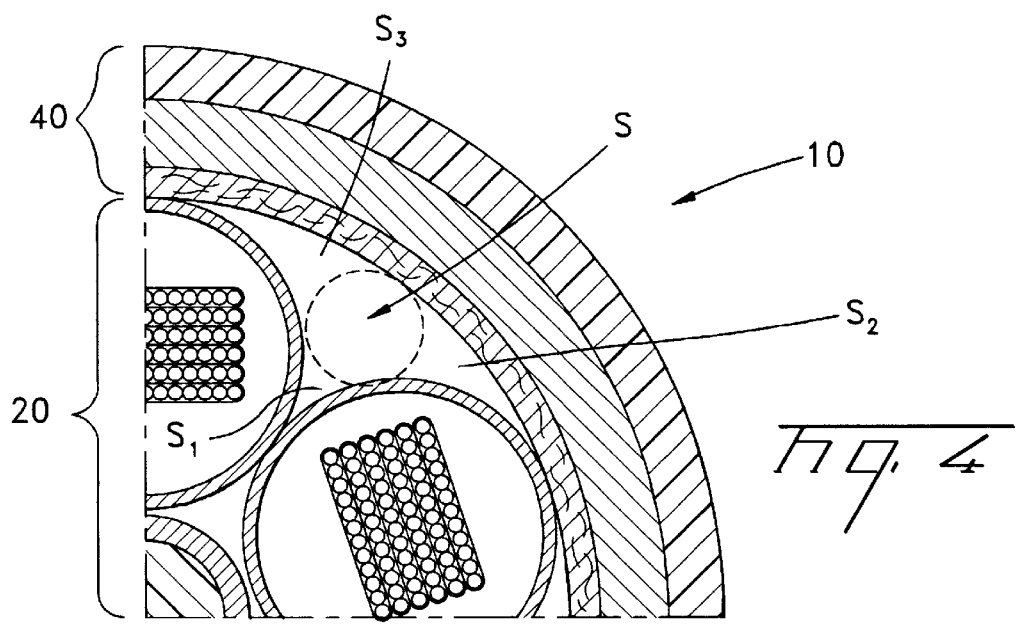

FIBER OPTIC CABLE

The present intention relates to a fiber optic cable having compressive strength members for high crush strength, and having water blocking members for preventing water migration in the cable.

BACKGROUND OF THE INVENTION

Fiber optic cables include optical fibers which transmit signals for cable television, computer, and telephone networks. Fiber optic cables are used in indoor and outdoor environments. The outdoor environment exposes the cable to the possibility of being flooded, or otherwise submerged in water. If the cable has leak-paths caused by fatigue, rodents or otherwise, the migration of water in the cable may cause failure of the cable components. Moreover, longitudinal water migration within the cable may cause the cable to act as a conduit, thereby flooding rooms or compartments to which the cable runs.

Fiber optic cables may be subjected to extrinsic compressive forces, for example, from cable support clamps or, for buried cable, the weight of earth and stone. A given cable must be robust enough to withstand such extrinsic forces. In the event that water migrates through the cable, or the cable experiences an overload of compressive forces, the ability of the optical fibers to transmit signals may be reduced or altogether eliminated.

To ensure that fiber optic cables are protected, cable components have been developed to inhibit water migration and to resist compressive forces. Such features comprise a water impermeable medium for inhibiting water migration, and compressive strength members for increasing the crush strength of the cable. Water impermeable mediums, also known as flooding compounds, generally comprise a greasy or jelly-like substance which is applied in the interstices between components inside the cable. However, where fibers in the cable are to be terminated to a connector or the cable network is to be modified, the craftsman must remove the flooding compound from the cable components with chemical de-greasing agents. This is a potentially messy and a time-consuming process, especially in taught sheath, midspan access operations. Moreover, manufacturing processes designed to apply the flooding compound to the cable components may be unsuccessful in completely filling each interstice, thereby leaving the possibly of water migration through non-filled interstice portions. To compound the problem, where compressive strength members are used the compressive strength members will generally increase the number of non-filled interstice portions.

Examples of conventional fiber optic cables are disclosed in GB Patent Specification 1601004, some of which cables include compressive strength members. In the examples where compressive strength members and a water impermeable medium are used in combination there are isolated non-filled interstice portions. Moreover, the recommended water impermeable medium is petroleum jelly, which, as noted above, is a messy and time-consuming substance to remove.

OBJECTS OF THE INVENTION

In view of the foregoing, it is an object of the present invention to provide a fiber optic cable which meets water migration and crush strength specifications without the necessity for a greasy water impermeable material.

It is a further object of the invention to provide a fiber optic cable having a water swellable material strategically located in an interstice thereof.

It is another object of the present invention to provide a fiber optic cable with water swellable members associated with respective compressive strength members, which water swellable members are arranged to inhibit the migration of water in sub-interstices adjacent to the compressive strength members.

It is a further object of the invention to provide a fiber optic cable having compressive strength members with water blocking members stranded therearound or alongside the compressive strength member.

BRIEF DESCRIPTION OF THE DRAWINGS

FIG. 1 shows an isometric view of a fiber optic cable according to the present invention.

FIG. 2 shows a cross sectional view of the fiber optic cable of FIG. 1 taken along line 2—2.

FIG. 3 shows a section of the fiber optic cable of FIG. 2.

FIG. 4 is an illustrative view of the fiber optic cable of FIG. 3.

DETAILED DESCRIPTION OF THE INVENTION

Figure 5:
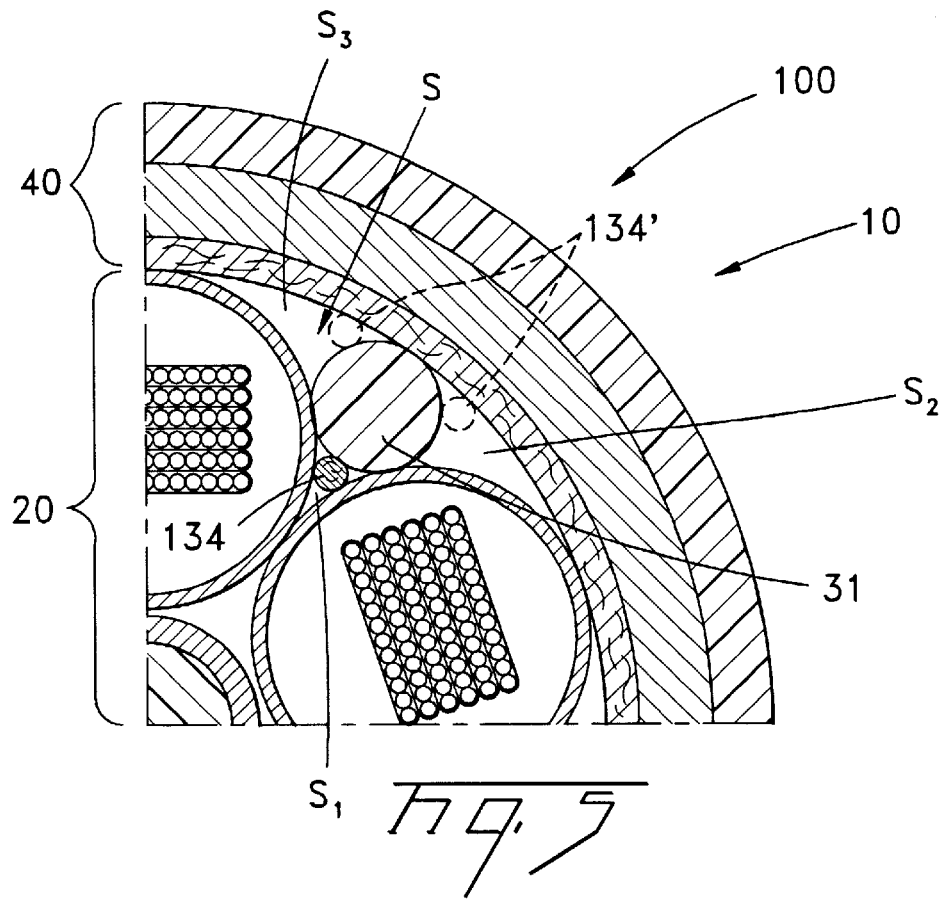
FIG. 5 is a section of a fiber optic cable according to a second embodiment of the present invention.

Referring to FIGS. 1–3, a fiber optic cable 10 according to the present invention will be described. Fiber optic cable 10 includes a tube section 20 and sheath section 40. Between tube and sheath sections 20 and 40 is a series of general interstices S (FIG. 2), each general interstice S comprises respective sub-interstices S1,S2,S3 (FIG. 4). Additionally, each general interstice S contains a respective interstitial assembly 30 (FIG. 2) strategically disposed therein. Interstitial assemblies 30 advantageously contribute to the crush strength and water inhibiting features of fiber optic cable 10.

Tube section 20 includes a central strength member 21 formed of a dielectric material. Central strength member 21 is surrounded by a water swellable tape material 22. A plurality of carrier members comprising buffer tubes 23 surround tape 22. Each buffer tube 23 includes optical fiber ribbons 24 with optical fibers 25 therein, for example, optical fiber ribbons made by Siecor Corporation, of Hickory, N.C. Buffer tubes 23 are preferably S-Z stranded about central strength member 21 in a conventional S-Z stranding manufacturing process. Where the optical fiber count so requires, solid filler rods may be substituted for buffer tubes 23. In either event, tube section 20 is bound together with a binder 26.

Sheath section 40 includes a water swellable tape material 41 which surrounds tube section 20. Tape material 41 is bound by a binder 42. Sheath section 40 is provided with a conventional rip cord 43 and dielectric tensile strength members 44. An armor tape material 45 surrounds rip cord 43 and dielectric strength members 44. A durable outer jacket 46 completes sheath section 40.

As best shown by FIG. 3, a typical interstitial assembly 30 according to the present invention comprises a cable reinforcing member, for example, a compressive strength member 31. Compressive strength member 31 is formed of a solid material, for example, a dielectric material, e.g. a low or medium density polyethylene material or a polypropylene material. Interstitial assembly 30 also comprises conventional water swellable members, for example, commercially available elongated water swellable yarns 34 and 36. Water swellable yarns 34 and 36 are generally helically stranded about compressive strength member 31, but yarns 34 and 36 comprise are stranded in opposite directions.

As best shown in FIG. 2, fiber optic cable 10 comprises a series of interstitial assemblies 30 disposed in general interstices S between tube section 20 and sheath section 40. Each interstitial assembly 30 is stranded into a respective general interstice S during the S-Z stranding manufacturing process. For illustrative purposes, a section of a cable 10' is shown in FIG. 4 with an interstitial assembly 30 removed, but having the profile of compressive strength member 31 shown in a phantom line within general interstice S. As noted above, general interstice S is defined between tube section 20 and sheath section 40. Each general interstice S comprises a set of generally discrete sub-interstices S1,S2, S3. Sub-interstice S1 is, relative to the center of cable 10, located generally radially inwardly of sub-interstices S2 and S3. However, sub-interstice S1 may be isolated, i.e. it is generally not in communication with either of sub-interstices S2 or S3. This is because points of contact, indicated as points C in FIG. 3, preferably exist between compressive strength member 31 and respective adjacent buffer tubes 23 and tape 41. The contact of tubes 23 with compressive strength member 31 generally isolates sub-interstice S1 from sub-interstices S2 and S3.

In a first embodiment of the present invention, water swellable yarns 34 and 36 are generally helically stranded about a respective compressive strength member 31. For example, along certain lengths of cable 10, yarn 34 will occupy sub-interstice S1 (FIG. 3), but its helical lay runs it about member 31 until it passes sub-interstice S2 and arrives at sub-interstice S3. Yarn 34 and yarn 36 are stranded in opposite directions, whereby yarn 36 moves from sub-interstice S3 (FIG. 3) to the position formerly occupied by yarn 34, i.e. it moves into sub-interstice S1, but its helical lay runs it about member 31 until it passes sub-interstice S2 and arrives back at sub-interstice S3. Thus along the length of cable 10, yarns 34 and 36 will preferably alternately occupy sub-interstices S1,S2,S3. The stranding of yarns 34 and 36 in generally opposite directions about compressive member 31 results in a series of cross-over points 38 (FIG. 1), i.e. where the yarns come in contact with each other.

In operation, yarns 34 and 36 will swell when in contact with water and thereby block water migrating in any of sub-interstices S1, S2, or S3. If water were to exist in general interstice S, water swellable tape 41 will swell across S2 and S3 and the yarn 34 or 36 which occupies sub-interstice S1 will swell thereacross. Thus although points C between tubes 23 and strength member 31, as described above, generally isolate sub-interstice S1 from water swellable tape 41, the occupation of sub-interstice S1 by one of the water swellable yarns ensures that sub-interstice S1 is protected against water migration. There will be, however, discrete sections of cable 10 where neither of yarns 34 or 36 will occupy sub-interstice S1. However, sufficient water blocking is assured because cable 10 is fabricated such that one or the other of yarns 34,36 will occupy sub-interstice S1 at a suitable frequency, for example, about 250 mm of cable length.

FIG. 5 illustrates further embodiments of the present invention. For example, in a second embodiment of the present invention, a cable 100 includes a water swellable member comprising a single water swellable yarn 134 generally helically stranded about a compressive strength member 31. Yarn 134 will, according to its pitch, variously occupy positions in sub-interstices S1, S2, or S3, which positions are indicated as 134' in FIG. 5. Yarn 134' will occupy sub-interstices S2 and S3 in other cross sections of cable 10.

Figure 7:
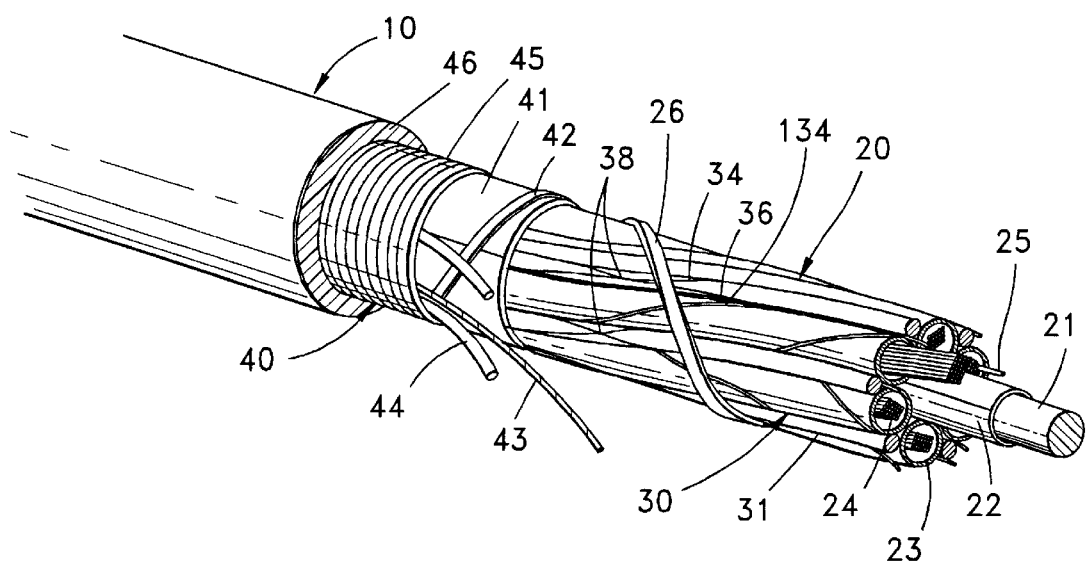
FIG. 7 is an isometric view of a fiber optic cable according to the present invention.

Additionally, in a third embodiment of the present invention, yarn 134 is stranded about a respective buffer tube 23 (FIG. 7) but will, as in the first and second embodiments of the present invention, occupy sub-interstice S1 at certain intervals along the cable the yarn is stranded along buffer tube 23. In the third embodiment, central member 21 may be enlarged to allow yarns 34 and 36 to pass between tubes 23.

Figure 6:
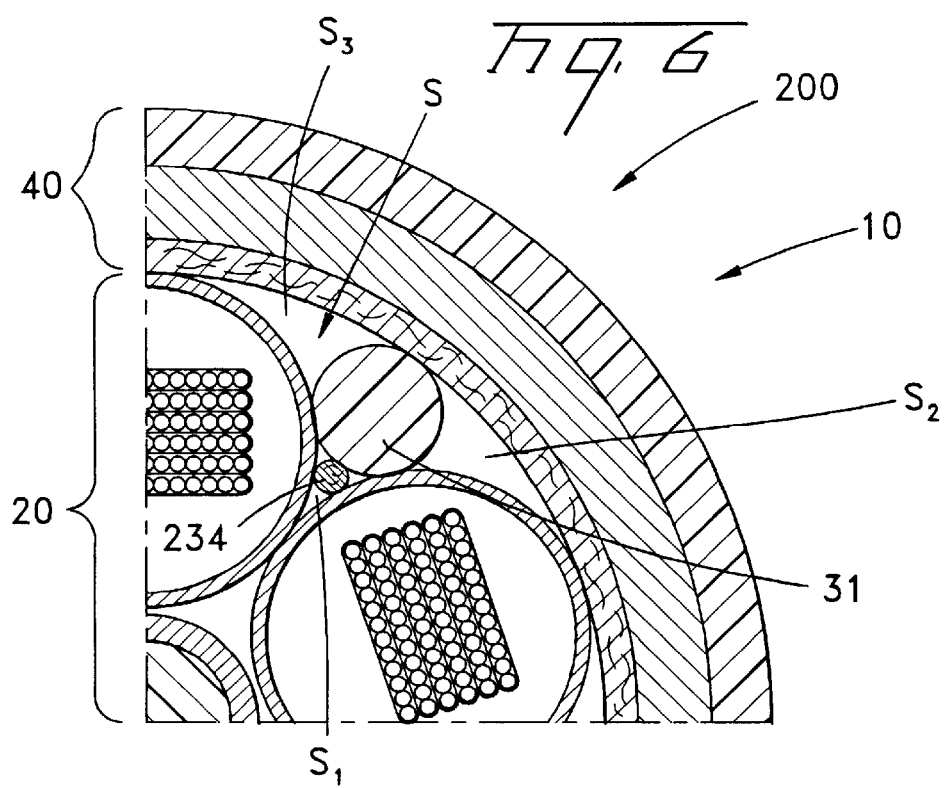
FIG. 6 is a section of a fiber optic cable according to a further embodiment of the present invention.

Furthermore, in a fourth embodiment of the present invention, a fiber optic cable 200 comprises a water swellable yarn 234 which is disposed in sub-interstice S1 whereby the yarn remains in sub-interstice S1 alongside member 31, as shown in FIG. 6. In the fourth embodiment, yarn 234 is not stranded about compressive strength member 31 and will preferably may not occupy positions in sub-interstices S2 or S3.

The foregoing embodiments are illustrative examples of the present invention, and persons of ordinary skill in the art will appreciate that other embodiments of the present invention can be practiced without departing from the scope of the appended claims. In any of the foregoing embodiments of the present invention, a given water swellable yarn may be advantageously secured to its respective compressive strength member 31 by an adhesive, a binder yarn, or other securing means. Additionally, the number and contents of tube and sheath sections 20,40 can be modified without departing from the scope of the appended claims.

Accordingly, what is claimed is:

1. A fiber optic cable comprising:

tube and sheath sections;

a general interstice defined between said tube and sheath sections of said cable;

said tube section comprises an optical fiber, said sheath section comprises a sheath which surrounds said tube section;

an interstitial assembly disposed in said general interstice;

said interstitial assembly defining sub-interstices within said general interstice; and said interstitial assembly comprises a compressive strength member and a water swellable member, said water swellable member being disposed generally alongside said compressive strength member in a radially inner sub-interstice of said general interstice.

2. The fiber optic cable of claim 1, wherein said interstitial assembly comprises a plurality of water swellable members, said water swellable members being stranded about said compressive strength member.

3. The fiber optic cable of claim 2, wherein said water swellable members are stranded in opposite directions.

4. The fiber optic cable of claim 1, wherein one of said sub-interstices is generally isolated from other said sub-interstices by said compressive strength member, said generally isolated sub-interstice receives a portion of said water swellable member.

5. The fiber optic cable of claim 4, wherein said one generally isolated sub-interstice comprises a radially innermost position relative to other sub-interstices in said general interstice.

6. The fiber optic cable of claim 1, wherein said water swellable member is stranded whereby it varyingly occupies respective ones of said sub-interstices about said compressive strength member.

7. The fiber optic cable of claim 1, wherein said water swellable member is generally helically stranded about the compressive strength member whereby it varyingly occupies respective ones of said sub-interstices about said compressive strength member.

8. The fiber optic cable of claim 1, wherein said water swellable member is stranded about a buffer tube of said tube section.

9. A fiber optic cable comprising:
   a general interstice disposed between tube and sheath sections of said cable, said general interstice comprises a radially inner sub-interstice and a compressive strength member; and
   a water swellable member disposed in said radially inner sub-interstice, said water swellable member is stranded about a buffer tube of said tube section.

10. A fiber optic cable comprising:
    tube and sheath sections;
    a general interstice defined between said tube and sheath sections of said cable including a compressive strength member;
    said tube section comprises an optical fiber, said sheath section comprises a sheath which surrounds said tube section;
    an interstitial assembly disposed in said general interstice;
    said interstitial assembly defining sub-interstices within said general interstice; and
    said interstitial assembly comprises a water swellable member, said water swellable member being located in one of said sub-interstices and is stranded about a buffer tube of said tube section.

11. A fiber optic cable comprising:
    tube and sheath sections with a general interstice formed therebetween;
    said tube section comprises an optical fiber, said sheath section comprises a sheath which surrounds said tube section;
    an interstitial assembly located in said general interstice;
    said interstitial assembly comprises a compressive strength member and a generally helically stranded water swellable member.

12. The fiber optic cable of claim 11, wherein said water swellable member is stranded about said compressive strength member.

13. The fiber optic cable of claim 12 wherein said interstitial assembly comprises a plurality of water swellable members, said water swellable members being stranded about said compressive strength member.

14. The fiber optic cable of claim 13, wherein said water swellable members are stranded in opposite directions.

15. The fiber optic cable of claim 11, wherein said interstitial assembly comprises a plurality of generally helically stranded water swellable members.

16. The fiber optic cable of claim 15, wherein said plurality of water swellable members comprise points of contact therebetween.

17. A fiber optic cable comprising:
    a series of general interstices disposed between tube and sheath sections of said cable;
    said tube section comprising at least one optical fiber, said sheath section surrounding said tube section;
    said general interstices each include a respective interstitial assembly;
    each interstitial assembly includes a compressive strength member;
    a set of sub-interstices is defined, about each said compressive strength member, within respective said general interstices;
    said set of sub-interstices comprises respective radially innermost sub-interstices;
    each said interstitial assembly includes a water swellable member associated with a respective compressive strength member; and
    said water swellable members occupy respective positions in said innermost sub-interstices.

18. The fiber optic cable of claim 17, wherein said interstitial assembly comprises a plurality of water swellable members stranded about said compressive strength member.

19. The fiber optic cable of claim 18, wherein said water swellable members are stranded in opposite directions.

20. The fiber optic cable of claim 18, wherein said plurality of water swellable members comprise points of contact therebetween.

21. The fiber optic cable of claim 17, wherein said water swellable member is helically stranded about said compressive strength member.

22. A fiber optic cable comprising:
    (a) a general interstice disposed between tube and sheath sections of said cable, said general interstice comprises a compressive strength member defining a radially inner sub-interstice; and
    (b) a water swellable member disposed in said radially inner sub-interstice.

23. The fiber optic cable of claim 22, wherein said water swellable member is disposed alongside said compressive strength member in said radially inner sub-interstice, said water swellable member not being stranded about said compressive strength member.

24. The fiber optic cable of claim 22, wherein said water swellable member is stranded about said compressive strength member.

25. The fiber optic cable of claim 22, wherein said water swellable member is stranded about a buffer tube of said tube section.

* * * * *